United States Patent [19]
Shaffer

[11] Patent Number: 5,306,535
[45] Date of Patent: Apr. 26, 1994

[54] DECORATIVE CORNER INSERT FOR WINDOW OR DOOR OPENINGS WITH CONTOURED PLASTIC RESIN LAMINATED TO GLASS FORMING THE INSERT

[76] Inventor: B. Jeremiah Shaffer, 1332 Candlewood Dr., Columbus, Ohio 43235

[21] Appl. No.: 901,201

[22] Filed: Jun. 19, 1992

[51] Int. Cl.⁵ .............................................. B32B 9/00
[52] U.S. Cl. ...................................... 428/38; 428/34; 428/192; 428/426; 52/308; 156/63; 156/109
[58] Field of Search ................. 428/38, 34, 192, 426; 52/311, 308; 156/109, 63

[56] References Cited

U.S. PATENT DOCUMENTS

| | | | |
|---|---|---|---|
| 1,524,998 | 3/1923 | Russel | 428/38 |
| 1,709,267 | 4/1929 | Horton | 52/311 |
| 3,183,140 | 12/1960 | Gibson | 428/38 |
| 3,516,893 | 6/1970 | Gerard | 428/38 X |
| 3,546,051 | 12/1970 | Utz | 156/63 X |
| 3,580,192 | 5/1971 | Davidson | 52/311 X |
| 3,713,958 | 1/1973 | McCracken | 156/63 XR |
| 3,848,046 | 7/1972 | Machet | 428/38 |
| 4,154,880 | 5/1979 | Drenan | 428/38 |
| 4,217,326 | 8/1980 | Goralnik | 428/38 |
| 4,283,894 | 8/1981 | Raty | 52/311 |
| 4,335,170 | 6/1982 | Butler | 428/38 |
| 4,438,165 | 3/1984 | Butler | 428/38 |
| 4,488,919 | 12/1984 | Butler | 428/38 |
| 4,495,739 | 1/1985 | Drennan | 428/38 |
| 4,518,446 | 5/1985 | Drennan | 428/38 X |
| 4,619,850 | 10/1986 | Charlton | 428/38 |
| 4,791,010 | 12/1988 | Hanley et al. | 428/38 X |
| 4,904,513 | 2/1990 | De Nicolo | 428/38 X |
| 5,039,468 | 8/1991 | Sellers | 428/38 |

Primary Examiner—Patrick J. Ryan
Assistant Examiner—Abraham Bahta
Attorney, Agent, or Firm—Sidney W. Millard

[57] ABSTRACT

An insert for mounting in the corner of a door or window frame opening includes two mounting flanges bonded along two edges of a glass panel. The flanges define an L-shape. Mounting within the frame is by fasteners which extend through apertures through the flanges.

15 Claims, 4 Drawing Sheets

DECORATIVE CORNER INSERT FOR WINDOW OR DOOR OPENINGS WITH CONTOURED PLASTIC RESIN LAMINATED TO GLASS FORMING THE INSERT

FIELD OF THE INVENTION

This invention relates generally to decorative, generally triangular inserts for interior mounting at the corners of window and door openings. The inserts have the appearance of textured, colored and/or deeply contoured glass.

BACKGROUND OF THE INVENTION

Decorative windows composed of contoured and textured glass have been made for many generations, reaching a peak in popularity as architectural elements in the last century. Such windows are currently enjoying a revival in popularity, being used particularly as central elements in front doors and as adjacent elements above and beside such doors. Such windows are also being used increasingly in commercial applications for decorative purposes and to form portions of partitions.

Similarly, inserts for mounting at the corners of window of door openings are attaining popularity. Decorative windows and decorative corner inserts are not normally included in the same window opening but their use is a part of the same phenomenon and, indeed the manufacturing techniques also have some similarities.

In the traditional process, such windows and inserts are made from relatively thick plate glass, having various sorts of grooves and other contours ground therein and polished to restore smooth surfaces with desirable optical properties. Certain portions of glass surfaces may be textured using sand blasting, acid etching, or a process called "glue chipping" in which an adhesive applied to a sand blasted surface is stripped to leave a specific pattern. Such windows can also be made as composites of a number of glass panels having deeply beveled edges joined by lead strips contoured for this purpose. Leaded glass windows are quite expensive due to labor costs and breakage during cutting, beveling and assembly.

A number of attempts have been made to simulate traditional decorative windows using various manufacturing processes having lower associated costs. For example, windows with decorative designs and surfaces have been injection molded using clear thermoplastic materials, such as certain types of polycarbonate. However, injection molding has a serious disadvantage in the high cost of the tooling required. The high cost of the dies required in this application is particularly significant, since suppliers of such types of window, corner inserts and associated architectural elements generally need to have an inventory including a large number of window sizes and design patterns. A large number of dies are required and the expense is not practical. Further, injection molded elements have not generally met with commercial success as fine architectural units because they do not look and feel like real glass. Rather, thermoplastic panels are much too flexible compared to glass and transmit and reflect light differently than real glass. In addition, limitations in the ability of the die casting process to produce certain features, such as sharp internal and external edges, detract from the appearance of plastic substitutes for decorative glass panels.

A method for making a solid, continuous plastic part with a textured surface simulating stained glass is described in U.S. Pat. No. 3,848,046. In accordance with this method, a mold is first made by pouring a gel substance into a mold to form a gel layer. Before this layer hardens, an absorbent, such as dry powdered gelatin, is sprinkled on its surface. This powder absorbs moisture, swells, and merges into the gel surface while causing shrinkage of the surface, thereby forming a nodular surface texture. After the gelatin has hardened, a stained glass simulating material, such as polyester resin prepared in a liquid form with a catalyst added, is poured on the textured surface. After the resin hardens, the gelatin mold is dissolved in water and washed off the resin part, which is left as a finished article. In a modification of this process, a hardened plastic framework, including a number of openings, is dropped into the gelatin after the absorbent is added but before the gelatine hardens. Textured resin material is thus allowed to harden in the openings within the framework, simulating a window with multiple panes. While the gelatin mold produced in this process is certainly less expensive than the steel molds required for use in the injection molding process, it is only capable of producing a single finished article. Also, this process produces only a random nodular surface texture; it does not produce pictorial, sculptured designs within the surface of the finished article.

U.S. Pat. No. 3,546,051 describes a method for simulating the overall appearance of a stained glass window by providing a glass pane behind an injection molded plastic framework including a pattern of ribs forming pictorial fields. Various pictorial fields in the pane are colored using stencils. The framework is metallized by the application of metal foil under heat and pressure, by vacuum deposition, or by spraying. While this patent is directed at making a realistic framework, nothing is done about the glass except for coloring.

A method for making simulations of decorative glass panels using thermoplastic films and thin layers of resins adhered to glass panes is described in U.S. Pat. No. 3,713,958. A structure in which a coating of a substantially clear resin, such as an epoxy, vinyl, acrylic, or polyester type, is applied to one side of a glass pane, while light-transmissive glass tint is applied to the opposite side to simulate stained glass. For the resin, a copolymer of N-butyl methacrylate and methyl methacrylate in aromatic solvents was found to be compatible with glass.

U.S. Pat. No. 4,335,170 describes a method of simulating stained and leaded glass panels in which a very thin polyester film is attached to a sheet of glass using an adhesive. Individual film segments are cut to correspond with design segments having different colors. After the adhesive is applied to the film, a soap solution is applied thereon to neutralize the effect of the adhesive during the process of positioning the film on the glass. After the film is positioned on the glass, the soap solution is forced outward by pressure with a squeegee so that adhesion occurs.

U.S. Pat. No. 4,791,010 describes the application of a unique liquid mixture of ink and varnish to a glass pane in order to produce a simulated etched glass appearance. A framework of spacers is then placed atop the glass, adjacent to its edges, surrounding the ink and varnish image, and another glass pane is placed atop the spacers. These items are then formed into a permanent assembly, with the image protected on the inside surface of the first glass pane, as sealing materials are applied around outer surfaces of the spacers.

U.S. Pat. No. 4,154,880 describes a window pane with a decorative molding attached to one surface by an adhesive strip. The molding includes flanges which mechanically lock with the adhesive strip. This patent indicates that areas of the glass adjacent to the molding sections can be of different colors or can have different surface treatments, such as sandblasting.

The methods described in the above paragraphs have the disadvantage of providing only very thin coatings on the glass surfaces. U.S. Pat. No. 3,713,958, discussed above, describes the texturing of the resin with a rod or other tool to provide an irregular or wavy surface but none of the approaches discussed are capable of providing the deeply contoured or sculptured appearance, including recognizable pictorial elements, associated with historically structured decorative windows. Furthermore, none of these techniques can provide the wide variety of surface finishes associated with decorative glass at a reasonable cost.

A method for making a different sort of decorative panel is proposed in U.S. Pat. No. 3,516,893 which provides for printed acetate fabric adhesively attached on one side to a sheet of tempered glass. On the opposite side is a backing sheet, which is preferably methacrylate ester polymer. The adhesive is of a type, such as a mixture of acetone and butyl acetate, which totally or partially dissolves the acetate fibers of the fabric without destroying the color and pattern of the printed design. After the adhesive is cured, the tempered glass is shattered, creating a mosaic effect while retaining its panel form.

A number of patents describe methods for the simulation of multi-pane windows in structures having a continuous pane of glass to which other elements of substantial thickness are attached. For example, U.S. Pat. Nos. 4,495,739 and 4,518,446 describe a decorative window and a method for manufacturing, wherein ornamental lead strips are attached around the edges of one or more glass segments having an edge thickness of about one eighth of an inch, where each glass segment is bonded to an underlying glass pane, and where the strip is held in place by a polysulfide adhesive carried in its channel and mechanically locked by inwardly directed flanges at its edges. U.S. Pat. No. 4,904,513 describes a plurality of plates with beveled edges being adhesively attached to a single backing pane of glass, preferably through the use of a layer of polyvinyl butyrate under conditions of heat and pressure. In one variation, decorative strips are also glued in place between the beveled plates.

Some prior art patents describe either modifying a single glass pane to look like a multi-pane window, or alternately and additionally, attaching one or more additional pieces of glass to a backing pane. For example, U.S. Pat. No. 4,488,919 describes methods for making a simulated multi-pane beveled and leaded glass window by forming beveled groves to subdivide a glass or plastic plate, with smooth surfaces on both sides, into design segments of unrelieved panels. Lead strips are subsequently attached to the flat bottom walls of these grooves, which are preferably formed by machining. In an alternate method, the panel can be formed by injection molding. In another alternative construction, segments having a substantial thickness, such as sheets of glass, polycarbonate, or poly(methylacrylate) up to about one quarter inch in thickness, may be laminated to a base pane.

Certain design segments can be provided with a jeweled glass appearance by securing transparent shapes, having flat inner surface and faceted or smoothly curved outer surfaces, in place using a pressure-sensitive adhesive. U.S. Pat. No. 4,619,850 describes the attachment of a die cast lead component to each side of a sheet of glass, thereby simulating lead strips holding individual pieces of glass. Surface treatments, such as coloring, sand blasting, or "glue chipping" conventionally applied to decorative glass windows may be applied if desired to various zones of the glass. In a modified version, a bevelled glass layer is adhesively bonded to a zone within the lead components.

U.S. Pat. Nos. 1,709,267; 3,580,192; and 4,283,894 illustrate decorative corner structure to be mounted in a window frame, door frame or simply at the intersection of two wall structures. Mounting techniques used in these three patents are diverse and indeed they are quite different from the mounting structures of the panels described above because they are concerned with generally triangular shaped elements not extending completely across the opening within a framework. Uniformly the mounting techniques are difficult to the extent that they often become problems to provide stability to the corner insert.

One method of replicating an article such as a surface configuration is to form a mold over the surface of the original article using liquid silicone. The formed mold may thereafter be filled with a resin, which is allowed to cure within the mold before it is removed as a replica. Traditional mold release agents, such as Teflon or silicone sprays have been used to prevent adhesion between the mold material and the cured resin replica articles. Such agents have also been used to facilitate the removal of molds poured around original objects. Such mild release agents are applied to the surface of the original object before the mold is made, and/or to the mold itself before the addition of material to be molded into a replica.

The removal of a silicone mold from a glass master such as used in this invention poses particular problems. The adhesive forces between the silicone and the glass are so great that as few as one in twenty molds is successfully removed from the master without serious damage using conventional prior art mold release agents. Furthermore, the use of traditional mold release agents, applied to the master before pouring the mold, renders the mold unacceptable for producing replicas of adequate quality since the release agents leave impressions in the mold which are subsequently transferred to the replicas as roughened surfaces. Due to the intended use of replicas to transmit light and to produce aesthetic effects similar to those produced by cut and polished glass surfaces, the production of plastic decorative glass replicas is much more sensitive to blemishes than is the production of virtually all other plastic parts by molding processes.

One potential solution to the prior art problems of using the decorative glass replica in architectural applications is to form the plastic decorative layer on a conventional glass pane, which then acts as a backing for the decorative plastic layer. A technical problem still requiring resolution is the adhesion between a cured resin plastic layer and the glass pane used as the backing plate. Excellent adhesion is required, so that the resulting decorative windows can be used in exterior architectural applications without delamination occurring due to large amount of thermal expansion which occurs between hot summer days and cold winter nights. A solution to this problem is disclosed in pending application Ser. No. 807,236 and to the extent necessary for a full understanding of this invention it is incorporated herein by reference.

SUMMARY OF THE INVENTION

Thermoplastic resin is bonded to one surface of a tempered glass panel cut to shape. The layer of plastic extends essentially completely across one face of the glass and it assumes the shape of decorative, beveled or textures glass by virtue of a silicone mold clamped to the glass pane along its edges.

The mold is formed over a master to assume the desired shape and the liquid resin forming the mold comprises a catalyzed silicone mixture of silicone, a catalyst and a light oil.

In the manufacturing process, the mold is clamped to a glass panel and inclined at a suitable angle. A resin which is to be the resin bonded to the surface of the glass panel is injected in liquid form through one sidewall of the mold and the resin drains to the low point of the mold by gravity allowing air inside the mold to escape upward.

Objects of the invention not understood from the above will be appreciated upon a review of the drawings and the description of the preferred embodiments which follow.

DESCRIPTION OF THE PREFERRED EMBODIMENTS

Figure 1:
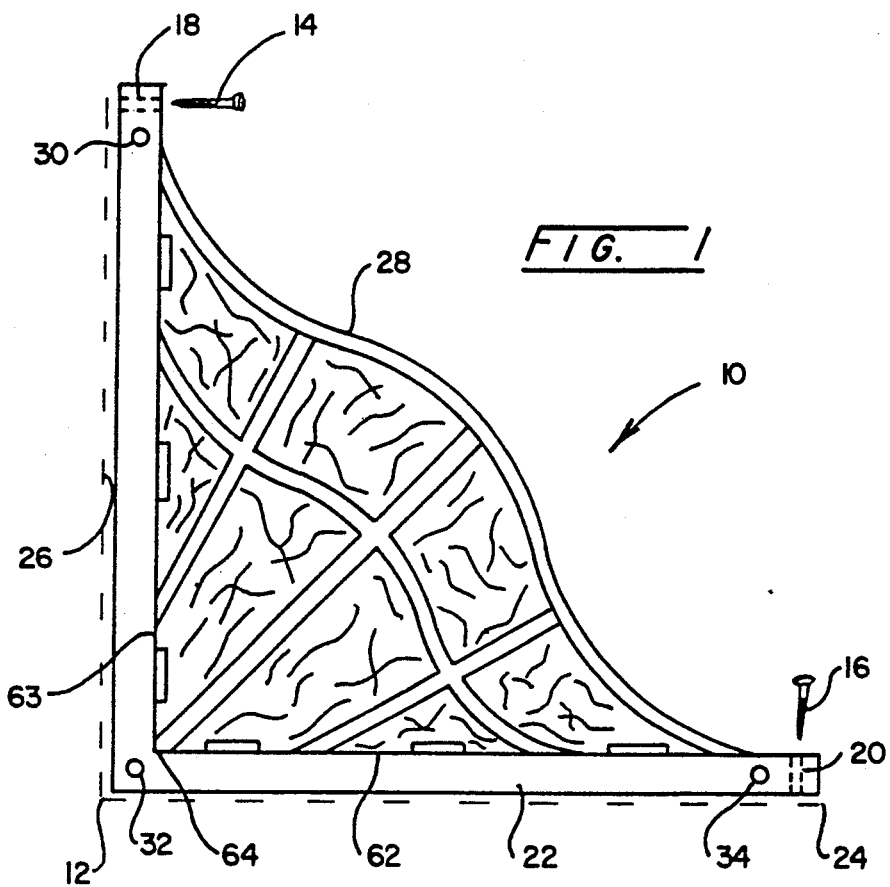
FIG. 1 is a side elevational view of a decorative corner panel according to this invention.
Figure 10:
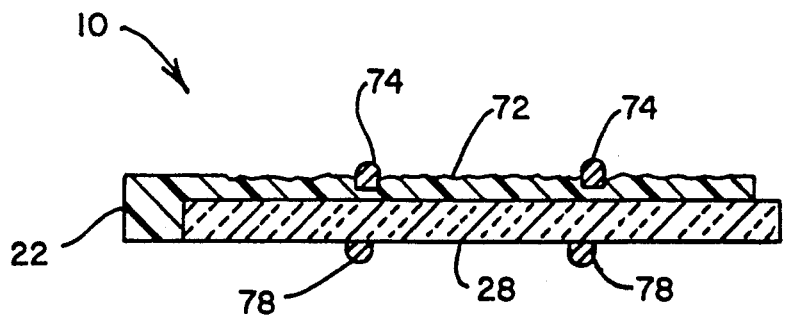
FIG. 10 is a sectional view of a decorative glass panel according to this invention having lead elements adhesively bonded in grooves formed by the mold.
Figure 11:
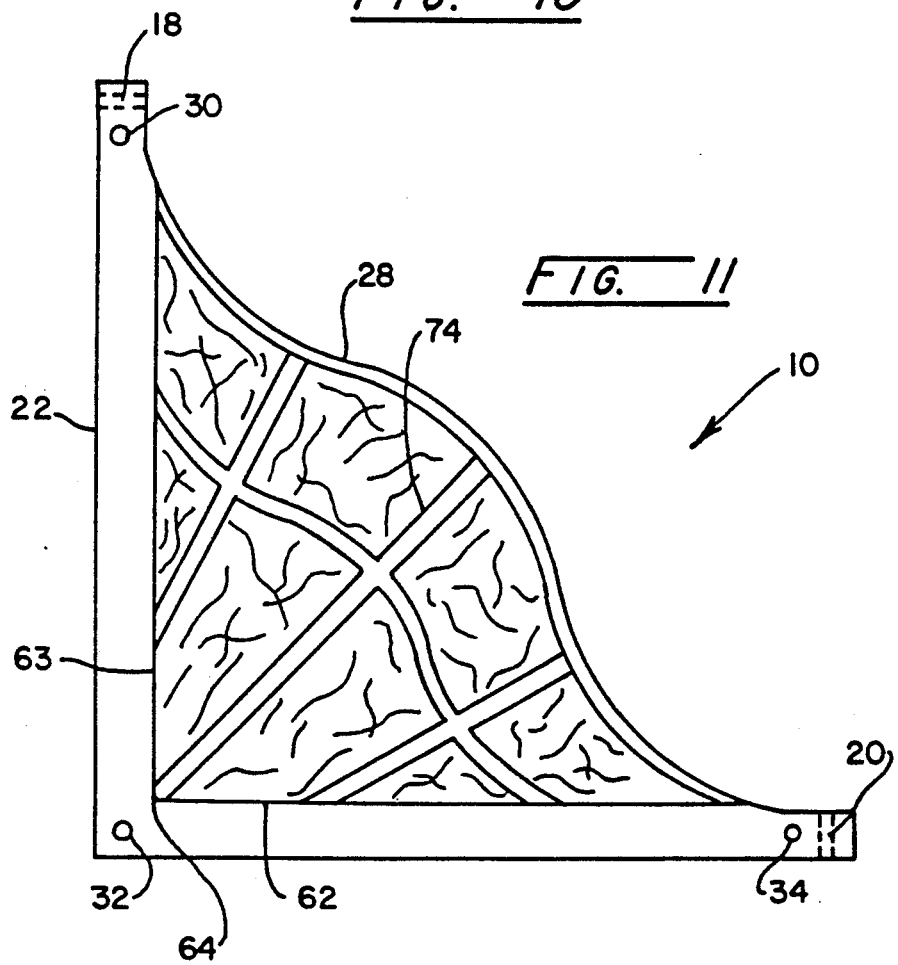
FIG. 11 is a decorative glass panel according to this invention where a mounting flange is molded to a decorative glass panel as a separate step.
Figure 12:
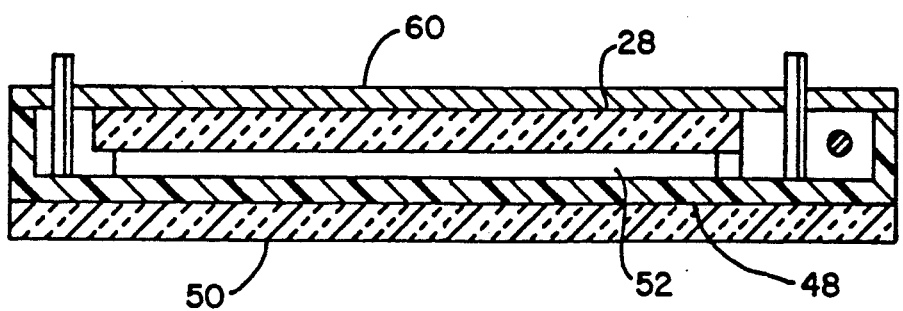
FIG. 12 is a sectional view of molding apparatus for the molding of FIG. 11.

Looking to FIGS. 1, 10 and 11, this invention provides a decorative insert 10 for mounting at the corner 12 of a window or door frame.

As illustrated in FIG. 1 the insert 10 is mounted within the frame by screws 14 and 16 or other fasteners which extend through apertures 18 and 20 in mounting flange 22 and penetrate the surfaces of the horizontal edge 24 and the vertical edge 26 of the frame. It will be observed that apertures 18 and 20 extend generally parallel with the glass plate 28. There are also three apertures 30, 32, 34 which extend through mounting flange 22 in a direction perpendicular to glass plate 28. These latter apertures 30, 32, 34 are useful for mounting the insert 10 when it is more convenient to thread the screws into a wall structure extending away from the door or window opening rather than the structure defining the frame opening. It will be noted that there are three apertures which extend perpendicular to glass plate 28 while there are only two extending parallel. Such additional support is preferred when the mounting is by way of screws extending perpendicular to the glass plate. The mounting flange 22 is designed to allow screws both parallel and perpendicular to the glass plate to accommodate whatever structure exists at the mounting site.

Figure 3:
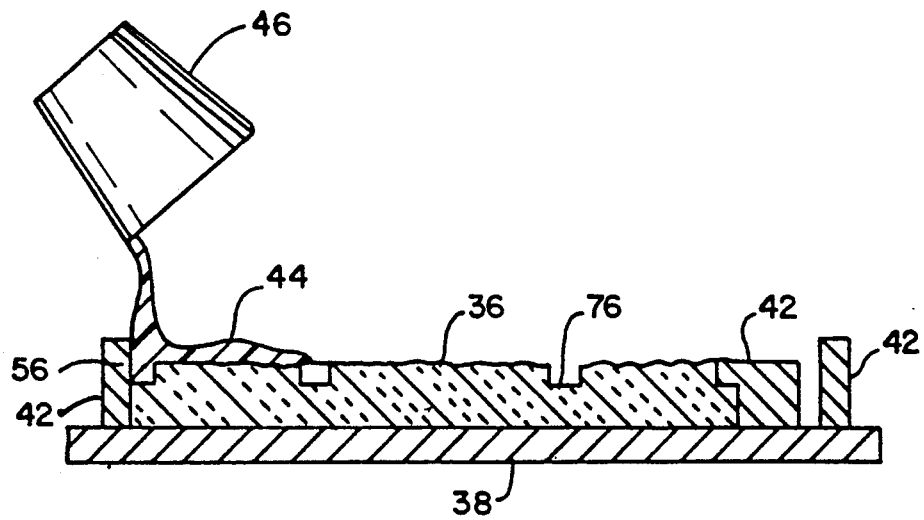
FIG. 3 is a sectional view of a master having a liquid silicone poured thereon to form a mold.
Figure 4:
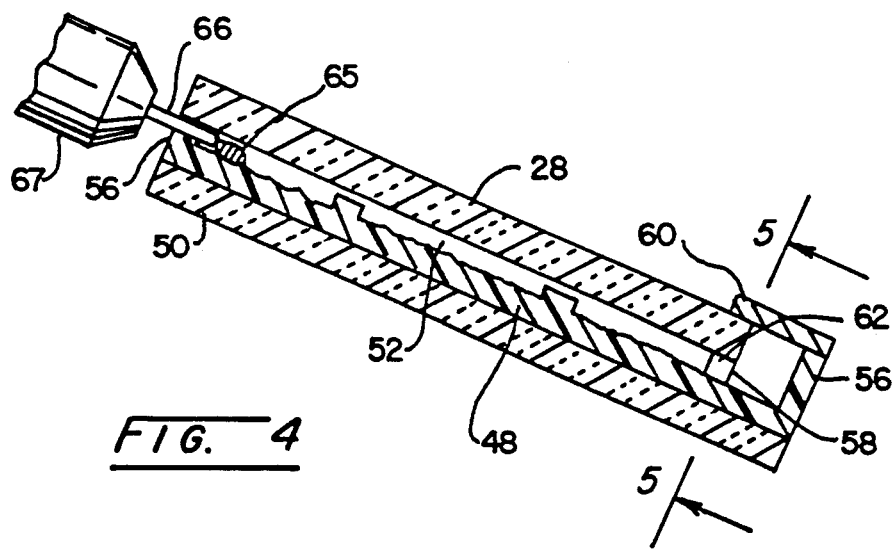
FIG. 4 is a sectional view taken along line 4—4 of FIG. 2.
Figure 5:
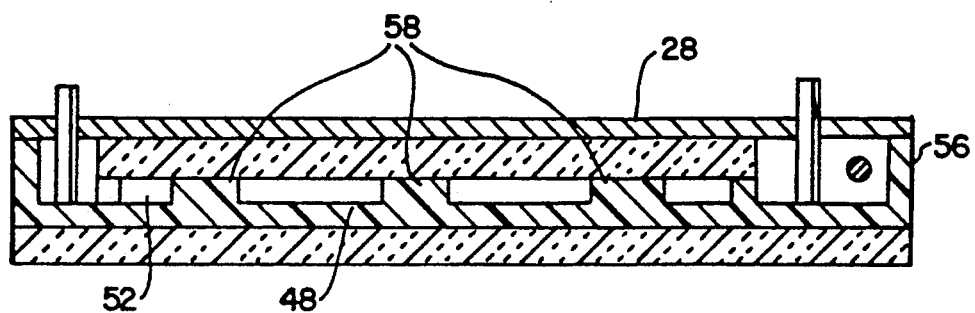
FIG. 5 is a sectional view taken along line 5—5 of FIG. 4.
Figure 6:
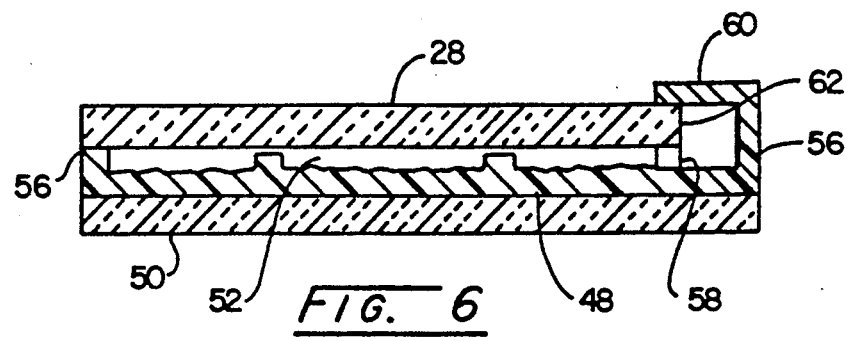
FIGS. 6-9 are similar to FIG. 4 but showing in each case a slightly different structure for the mold and framework used to apply the resin to one surface of the glass panel.
Figure 7:
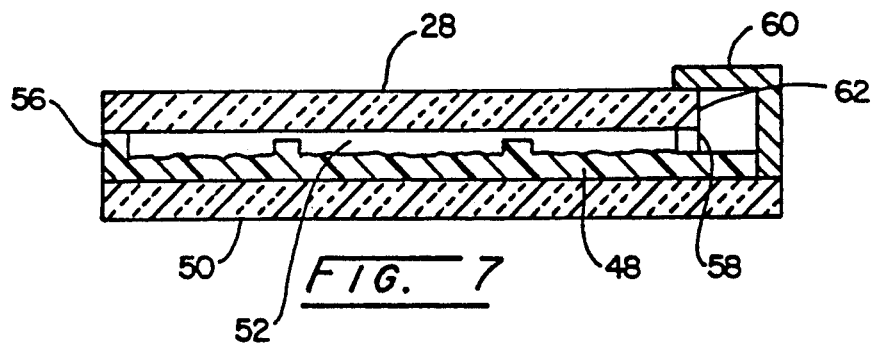
Figure 8:
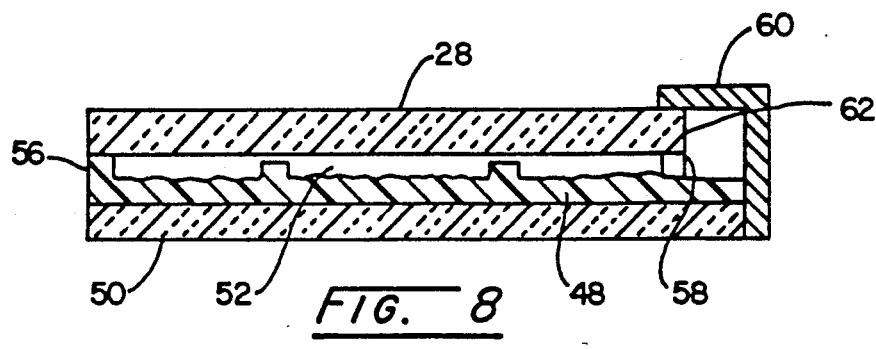
Figure 9:
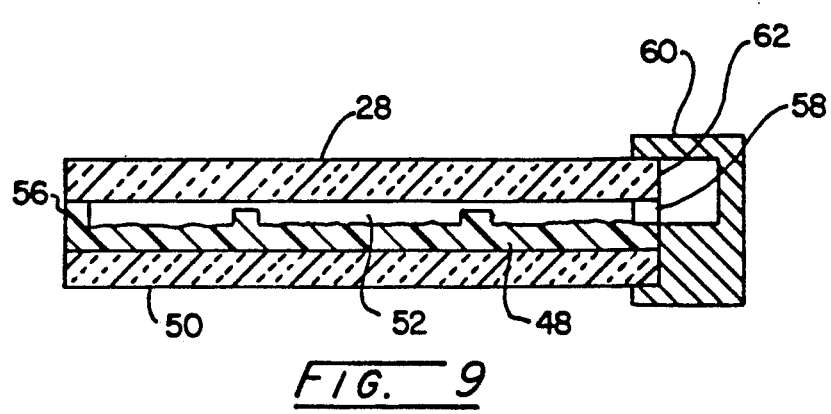

Looking to FIGS. 3-5, the formation of the mold and molding apparatus is illustrated. Initially a glass master 36 is formed by conventional methods and secured to a substrate 38. As shown in FIG. 3 the master is bordered by a spacer 40 and surrounded by a barrier 42.

The particular shape or configuration of the upper surface of glass master 36 is not critical, any particular shape may be used. To form the mold as a mirror image of the glass master a catalyzed silicone 44 is discharged from a source 46 to conform by gravity to the configuration of the glass master. There may be parts of the glass master which are textured in some fashion, but for those surfaces which are not textured it is preferred that they be polished to a high gloss and waxed using a wax product such as JOHNSON'S PASTE WAX which can be obtained from S. C. Johnson & Son, Inc. of Racine, Wis. The reasons for the wax will be explained subsequently.

The catalyzed silicone is in fact a mixture 44 of products which includes ten parts HS II RTV Silicone, available from Dow Corning Corporation of Midland, Mich., mixed with one part 10:1 Colored HS II Catalyst, also available from Dow Corning. In addition, a light oil additive, such as Hoppe's 1003, supplied by Penguin Industries of Coatsville, Pa. is mixed with a fast curing tin catalyst, such as HS II RTV Catalyst, also available from Dow Corning. About thirty cubic centimeters of oil additive and ten cubic centimeters of fast curing catalyst is added per pound of silicone mixture. These components are mixed first with each other, and then with the mixture of RTV Silicone and Colored HS II Catalyst. Before the resulting mixture 44 is poured into the cavity of the glass master it is placed under vacuum for three to five minutes to remove entrapped air.

The use of the light oil additive makes it unnecessary to apply a conventional mold release agent to the surface of the glass master before the catalyzed silicone is poured. If less than twenty cubic centimeters of oil is added per pound of silicone mixture, this effect is lost and a conventional mold release agent is needed to prevent the tearing of the mold due to adhesion between the mold and the glass. If more than forty cubic centimeters of oil is added per pound of silicone mixture, the oil migrates to the surface of the mold leaving an unacceptable image on the surfaces of replicas formed within the mold. This migration in a mold having too high an oil content occurs over time; the useful life of such a mold is reduced thereby from a capability of producing over thirty satisfactory replicas to six or less. Thus, adding light oil as an additive in the proper proportion eliminates the need for and associated problems with conventional mold release agents, such as, impressions left on the surface of the mold, which in turn leave unacceptable blemishes on the smooth surfaces of the replicas.

The wax previously applied to the glass master is also a preferred part of this process. If this waxing is not done, a coating of silicone is left on the surface of the glass master when the mold is removed. As a result, the mold is suitable for making replicas, but the glass master is not suitable for making additional molds when they are required. Using wax in this way does not cause unsatisfactory images to be left on replicas subsequently made using the mold.

The use of a fast curing tin catalyst hastens the mold curing process, allowing more rapid mold fabrication. If too much tin catalyst is used, the curing process does not allow an adequate working life for the mixture to be properly applied within the mold cavity. Using ten cubic centimeters of this catalyst per pound of silicone mixture produces a working life of about one half hour, which has proven to be adequate for this purpose.

After the silicone mold is properly cured it is removed to serve as a mold to be filled with a suitable thermoplastic resin for bonding to one surface of the glass plate 28. A suitable resin for this purpose has been found to be a polyester material.

Figure 2:
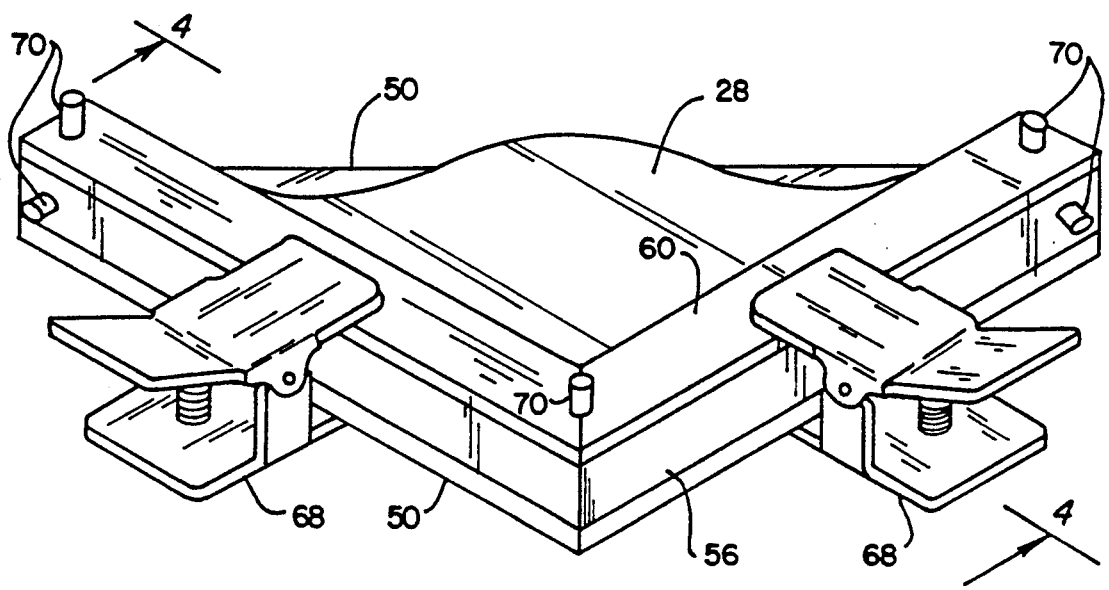
FIG. 2 is a perspective view of a framework clamping a mold to a glass panel during the manufacturing process of this invention.

Looking particularly to FIGS. 2, 4 and 5, the mold 48 formed from the mixture 44 in FIG. 3 on the surface of glass master 36 is inverted and placed on a mold support 50. Mold support 50 is illustrated as being a piece of glass and that has been found to be satisfactory, but for manufacturing purposes it could as easily be wood, steel or aluminum.

The cavity 52 on the upside of the mold 48 is covered by the planer glass plate 28. In a preferred version of this process, prior to mounting plate 28 on the mold 48 a coating is applied to the downwardly facing side of the glass plate. The desired coating is an adherent chemical which adheres to both the glass and the resin to be bonded to the glass. Preferably, the adherent chemical permits the resin and glass to adhere to one another by the cross-linkage of polymer chains with the structure of the adherent.

In the preferred process, glass sheet 28 is washed and one surface is coated with a mixture of alcohol, water and organosilane ester, which may be obtained as Type A174 from Union Carbide of Atlanta, Ga. The preferred mixture for this purpose is composed of equal volumes of deionized water and denatured alcohol to which 0.5 percent, by volume, of organosilane ester is added. The water and alcohol evaporate, leaving a dried coating of organosilane ester on the downwardly facing surface of glass sheet 28. This coating has been found to function as an adherent when applied in this manner. This method is superior, in terms of the adhesive properties of the lamination subsequently formed, to the use of organosilane ester simply as a component in the catalyzed resin mixture.

Note that the glass plate 28 is supported in position by a ridge 56 which extends along one side of the mold and also by supports 58 which project upwardly from the cavity bottom to the same level as the ridge 56 such that the glass plate 28 is approximately parallel with mold support 50. There may be some reason why this would not be true, but in the preferred embodiment it works satisfactorily.

To the right-hand side of FIG. 4 is another portion of ridge 56 circumscribing the cavity 52 and it will be noted that the right-hand side ridge extends to a higher elevation than the ridge 56 on the left-hand side of FIG. 4. The particular elevation is not critical and it will be observed that there are several modifications of this feature in FIGS. 6-9. The whole purpose is to configure an apparatus to confine the mold cavity area 52 for the injection of a thermoplastic resin to bond the resin to the downwardly facing surface of glass panel 28 and form a mounting flange 22 along two sides thereof. A bridge 60 of various structural configurations is shown in FIGS. 4 and 6-9, and in each case it serves to provide a flange 22 bonded to the edge 62 of the glass plate 28. It will be noted in FIGS. 1 and 2 that there are two edges 62 and 63 which converge at a corner 64 at a 90 degrees angle and the flange 22 is a generally L-shaped element bonded to the glass edges 62 and 63. It will also be observed that each leg of the L-shaped flange extends beyond the glass edges 62 and 63 and it also is thicker than the glass pane 28.

The preferred polyester resin 65 is delivered by a duct 66 through ridge 56 from a source 67 into cavity 52 and preferably at the upside of the mold cavity. It is preferred that the corner portion 64 of the insert be angled downwardly and that the resin be injected from the upper most end so that air can escape upwardly as the resin flows downwardly by gravity.

The resin 65 is in fact a mixture of about 97.3 percent clear polyester resin, supplied as Product 249A by B.P. Chemicals of Ft. Wright, Ky.; 1.0 percent organosilane ester, supplied as Type A174 by Union Carbide of Atlanta, Ga.; 0.85 percent methylethylketone peroxide, supplied as Cadox-M-50 by Akzo Chemical of Chicago, Ill.; and 0.85 percent heat curing catalyst, supplied as USP-240 by Witco Chemical of Richmond, Calif. has been found to work well as the catalyst resin for this application. Alternatively, a tinted plastic resin could be used to obtain a different visual effect in the replica. It will be understood that colored resin may be used if desired. Indeed, a plurality of different colored resins may be used to provide a multicolored panel by selective use of dams within the mold 48. Alternatively, color may be applied to one surface of glass pane 28 prior to the injection of resin 65.

The resin curing process is begun by the methylethylketone peroxide and completed, as the exothermic reaction raises the temperature of the mixture to about 200° F., by the heat curing catalyst. The organosilane ester within the mixture, together with the layer of this material which has dried on the surface of the glass sheet 28, promotes the adhesion of polymers from the resin 65 to the surface of glass sheet 28, particularly by the cross-linking of polymer chains within the resin with organosilane ester adhered to the glass surface. These products may be properly mixed and dispensed through duct 66 by means of a resin transfer molding machine, such as a Multiflow CVR type, supplied by Liquid Control Corporation of North Canton, Ohio.

After the cavity 52 is filled with resin 65 it is left in place to cure. A complete cure is generally achieved at room temperature in one to two hours.

Prior to the injection of the polyester resin 65 into cavity 52 the bridge 60 is clamped into place by clamps 68, as illustrated in FIG. 2, which hold the bridge in place with sufficient compression to create a seal with bridge 60 against the upper surface of glass 28 and between the lower surface of the glass and the ridge 56 on the left-hand side of FIG. 4.

It will be noted that pegs 70 are shown projecting through the areas of the mounting flange 22 separated from the edges of the glass panel 28. Their purpose is to create mounting apertures in the mounting flange to receive screws which may project through the flange and be screwed into the frame of the opening or the sidewall around the opening, depending upon the structure of the opening itself. It is anticipated that release coatings of some kind will be applied to pegs 70 to facilitate easy removal and indeed the pegs themselves may be slightly tapered for the same reason. Should the flange 22 extend along only one edge of the glass plate, there are a minimum of two screw-receiving apertures.

After the resin has cured the spring clamps 68 are removed and a replica consisting of glass plate 28 and a laminated cured resin layer 72 as illustrated in FIG. 10 are removed from the mold and ready for installation.

In some instances it may be desirable to provide a facsimile of a leaded glass window and in such an instance the pattern illustrated in FIG. 11 will receive a lattice work 74 of lead colored material fitting the exact pattern of the flat bottom 76 formed in the master 36, see FIG. 3. Flat bottom 76 receives an adhesively bonded overlay or lattice work 74 such that it appears that the glass panel 28 is a plurality of glass pieces which are held in place by the lead lattice work. Indeed, on some occasions the lattice work may be applied both to the grooves as illustrated in FIGS. 10 and 11 and also on the downwardly facing side of the glass 28 as illustrated in FIG. 10 such that the lead lattice work appears in register on both sides of the structure. In this instance, the product comprising the "lead" may in fact be lead or some other metal or resin suitably colored to simulate lead.

It should be noted that the clamping strength of clamps 68 required to maintain a seal between glass plate 28 and mold 48 can fracture the glass. It has been found that annealed glass less than 3/16 inch thick has proved unsatisfactory. On the other hand, tempered glass as thin as ⅛ inch works satisfactorily.

Having thus described the invention in its preferred embodiment, it will be clear that modifications may be made without departing from the spirit of the invention. Also the language used to describe the inventive concept and the drawings accompanying the application to illustrate the same are not intended to be limiting on the invention. Rather it is intended that the invention be limited only by the scope of the appended claims.

I claim:

1. A decorative insert for mounting at the corner of a window or door frame comprising,
   a flat glass plate having a thickness and a peripheral edge,
   said peripheral edge including two generally planer edges converging to form a second corner having an angle of about the same angle as said frame corner,
   a mounting flange bonded to a planer edge for mounting said insert to said frame,
   said mounting flange having a thickness greater than the thickness of said glass plate,
   apertures extending through said mounting flange to accommodate a fastener extending through said flange to penetrate said frame,
   said apertures being located in said mounting flange so as not to pass through said glass plate.

2. The insert of claim 1 including a thermoplastic resin layer bonded to one face of said glass plate,
   said resin layer defining a decorative pattern.

3. The insert of claim 2 wherein the pattern comprises a series of interconnected grooves, said grooves having a flat bottom,
   a lattice shaped overlay corresponding in shape to the pattern of the interconnected grooves being adhesively bonded to the flat bottom of said grooves.

4. The insert of claim 3 including a second overlay adhesively bonded to the other face of said glass plate in register with said first overlay.

5. The insert of claim 4 wherein said apertures through said mounting flange are parallel with said flat glass plate.

6. The insert of claim 4 wherein said apertures through said mounting flange are perpendicular to said lass plate.

7. The insert of claim 6 including three said apertures, one of said apertures being located at the corner of said frame, one of the other two apertures being located in each leg of said frame remote from said corner.

8. The insert of claim 4 including apertures through said mounting flange both parallel with and perpendicular to said glass plate.

9. The insert of claim 8 including three apertures extending perpendicular to said glass plate, one of said perpendicular apertures being located at the corner of said frame and the other two perpendicular apertures being located remote from said corner with one in each leg of the L-shaped frame.

10. The insert of claim 9 including two apertures extending parallel with said glass plate, one said parallel aperture being located in each leg of the L-shaped frame remote from said corner.

11. The insert of claim 8 including two apertures extending parallel with said glass plate, one said parallel aperture being located in each leg of the L-shaped frame remote from said corner.

12. The insert of claim 1 including apertures through said mounting flange both parallel with and perpendicular to said glass plate.

13. The insert of claim 12 including three apertures extending perpendicular to said glass plate, one of said perpendicular apertures being located at the corner of said frame and the other two perpendicular apertures being located remote from said corner with one in each leg of the L-shaped frame.

14. The insert of claim 13 including two apertures extending parallel with said glass plate, one said parallel aperture being located in each leg of the L-shaped frame remote from said corner.

15. The insert of claim 1 wherein the mounting flange is L-shaped and extends along two edges of said glass plate, each leg of the L-shape of said flange extending beyond the glass plate.

* * * * *